US00RE46864E

(19) United States
(12) Reissued Patent
Westerman et al.

(10) Patent Number: US RE46,864 E
(45) Date of Reissued Patent: May 22, 2018

(54) INSERTION MARKER PLACEMENT ON TOUCH SENSITIVE DISPLAY

(71) Applicant: Apple Inc., Cupertino, CA (US)

(72) Inventors: Wayne Carl Westerman, Burlingame, CA (US); Bas Ording, San Francisco, CA (US); B. Michael Victor, Castro Valley, CA (US)

(73) Assignee: Apple Inc., Cupertino, CA (US)

(21) Appl. No.: 14/971,603

(22) Filed: Dec. 16, 2015

Related U.S. Patent Documents

Reissue of:
(64) Patent No.: 8,610,671
Issued: Dec. 17, 2013
Appl. No.: 11/965,570
Filed: Dec. 27, 2007

(51) Int. Cl.
*G06F 3/041* (2006.01)
*G06F 3/0481* (2013.01)
*G06F 3/0488* (2013.01)
*G06F 3/0485* (2013.01)

(52) U.S. Cl.
CPC ..... *G06F 3/04812* (2013.01); *G06F 3/0485* (2013.01); *G06F 3/04883* (2013.01); *H04M 2250/22* (2013.01); *H04M 2250/70* (2013.01)

(58) Field of Classification Search
CPC ..... G06F 3/0485
USPC ..... 345/173; 715/856
See application file for complete search history.

(56) References Cited

U.S. PATENT DOCUMENTS 5,483,261 A 1/1996 Yasutake
5,488,204 A 1/1996 Mead et al.
5,710,831 A 1/1998 Beernink et al.
5,778,404 A 7/1998 Capps et al.
5,825,352 A 10/1998 Bisset et al.
5,835,079 A 11/1998 Shieh
5,880,411 A 3/1999 Gillespie et al.
6,188,391 B1 2/2001 Seely et al.
6,262,735 B1 7/2001 Etelapera et al.
6,310,610 B1 10/2001 Beaton et al.
(Continued)

FOREIGN PATENT DOCUMENTS

EP 0 795 811 A1 9/1997
EP 1 850 217 A2 10/2007
(Continued)

OTHER PUBLICATIONS

"How Would You Like Selection/Copy/Paste to Work?", MAC Forums, http://forums.macrumors.com/showthread.php?p=3932833#post3932833.

(Continued)

*Primary Examiner* — Cameron Saadat
(74) *Attorney, Agent, or Firm* — Morrison & Foerster LLP

(57) ABSTRACT

In accordance with some embodiments, a computer-implemented method is performed at a portable electronic device with a touch screen display. The method can include: displaying graphics on the touch screen display, detecting a finger contact on the touch screen display, and, in response to the detected finger contact, inserting an insertion marker in the graphics at a first location. The method can further include detecting a finger movement on the touch screen display and, irrespective of initial distance from finger to insertion marker on the touch screen display, moving the insertion marker in accordance with the detected finger movement from the first location to a second location in the graphics.

66 Claims, 6 Drawing Sheets

(56) References Cited

U.S. PATENT DOCUMENTS

| | | | | |
|---|---|---|---|---|
| 6,323,846 | B1 | 11/2001 | Westerman et al. | |
| 6,570,557 | B1 | 5/2003 | Westerman et al. | |
| 6,677,932 | B1 | 1/2004 | Westerman | |
| 6,690,387 | B2 | 2/2004 | Zimmerman et al. | |
| 6,850,220 | B2 | 2/2005 | Sakaguchi | |
| 6,888,536 | B2 | 5/2005 | Westerman et al. | |
| 7,015,894 | B2 | 3/2006 | Morohoshi | |
| 7,023,428 | B2 * | 4/2006 | Pihlaja | 345/173 |
| 7,030,861 | B1 | 4/2006 | Westerman et al. | |
| 7,084,859 | B1 | 8/2006 | Pryor | |
| 7,088,344 | B2 | 8/2006 | Maezawa et al. | |
| 7,123,243 | B2 | 10/2006 | Kawasaki et al. | |
| 7,184,064 | B2 * | 2/2007 | Zimmerman et al. | 345/684 |
| 7,218,226 | B2 | 5/2007 | Wehrenberg | |
| 7,268,772 | B2 | 9/2007 | Kawai et al. | |
| 7,663,607 | B2 | 2/2010 | Hotelling et al. | |
| 8,479,122 | B2 | 7/2013 | Hotelling et al. | |
| 8,610,671 | B2 | 12/2013 | Westerman et al. | |
| 8,698,773 | B2 | 4/2014 | Westerman et al. | |
| 2002/0030665 | A1 | 3/2002 | Ano | |
| 2002/0059350 | A1 * | 5/2002 | Iwema et al. | 707/530 |
| 2004/0130575 | A1 | 7/2004 | Tai et al. | |
| 2004/0237053 | A1 | 11/2004 | Impas et al. | |
| 2005/0076300 | A1 * | 4/2005 | Martinez | 715/539 |
| 2005/0193321 | A1 * | 9/2005 | Iwema | G06F 3/04883 715/201 |
| 2006/0017692 | A1 | 1/2006 | Wehrenberg et al. | |
| 2006/0026521 | A1 | 2/2006 | Hotelling et al. | |
| 2006/0026535 | A1 | 2/2006 | Hotelling et al. | |
| 2006/0026536 | A1 | 2/2006 | Hotelling et al. | |
| 2006/0033724 | A1 | 2/2006 | Chaudhri et al. | |
| 2006/0053387 | A1 | 3/2006 | Ording | |
| 2006/0066588 | A1 | 3/2006 | Lyon et al. | |
| 2006/0085757 | A1 | 4/2006 | Andre et al. | |
| 2006/0097991 | A1 | 5/2006 | Hotelling et al. | |
| 2006/0125803 | A1 | 6/2006 | Westerman et al. | |
| 2006/0132460 | A1 * | 6/2006 | Kolmykov-Zotov et al. | 345/173 |
| 2006/0197753 | A1 * | 9/2006 | Hotelling | 345/173 |
| 2006/0238519 | A1 | 10/2006 | Westerman et al. | |
| 2006/0242607 | A1 | 10/2006 | Hudson | |
| 2006/0290678 | A1 | 12/2006 | Lii | |
| 2007/0115264 | A1 | 5/2007 | Yu et al. | |
| 2007/0150842 | A1 | 6/2007 | Chaudhri et al. | |
| 2007/0152978 | A1 | 7/2007 | Kocienda et al. | |
| 2007/0152980 | A1 | 7/2007 | Kocienda et al. | |
| 2007/0157085 | A1 * | 7/2007 | Peters | 715/531 |
| 2007/0257890 | A1 | 11/2007 | Hotelling et al. | |
| 2007/0260981 | A1 * | 11/2007 | Kim | G06F 3/04812 715/256 |
| 2008/0036743 | A1 | 2/2008 | Westerman et al. | |
| 2008/0165142 | A1 * | 7/2008 | Kocienda | G06F 3/04886 345/173 |
| 2008/0259040 | A1 * | 10/2008 | Ording et al. | 345/173 |
| 2009/0109182 | A1 * | 4/2009 | Fyke | G06F 3/0488 345/173 |
| 2009/0167700 | A1 | 7/2009 | Westerman et al. | |
| 2009/0228842 | A1 | 9/2009 | Westerman et al. | |

FOREIGN PATENT DOCUMENTS

| | | | |
|---|---|---|---|
| EP | 1 850 217 | A3 | 10/2007 |
| EP | 1 852 774 | A2 | 11/2007 |
| FR | 2 898 197 | A1 | 9/2007 |
| GB | 2 433 402 | A | 6/2007 |
| JP | 2000-163031 | A | 6/2000 |
| JP | 2002-342033 | A | 11/2002 |
| WO | WO-03/023593 | A1 | 3/2003 |
| WO | WO-2007/037806 | A1 | 5/2007 |
| WO | WO-2009/085779 | A1 | 7/2009 |
| WO | WO-2009/111249 | A2 | 9/2009 |
| WO | WO-2009/111249 | A3 | 9/2009 |

OTHER PUBLICATIONS

"Quasi Clipboard", Apple Web Apps, http://www.apple.com/webapps/utilities/quasiclipboard.html, last visited Feb. 7, 2008, one page.

European Search Report dated Aug. 20, 2009, for EP Appliction No. 09154312.4, filed Feb. 25, 2009, 10 pages.

Final Office Action dated Dec. 6, 2012, for U.S. Appl. No. 11/965,570, filed Dec. 27, 2007, 14 pages.

International Search Report dated Feb. 27, 2009, for PCT Application No. PCT/US08/087045, filed Dec. 16, 2008, four pages.

International Search Report dated Sep. 10, 2009, for PCT Application No. PCT/US2009/035177, filed Feb. 25, 2009, seven pages.

Invitation to Pay Additional Fees dated Jun. 9, 2009, for PCT Application No. PCT/US2009/035177, filed Feb. 25, 2009, six pages.

iPhone Copy and Paste video, You Tube, http://www.youtube.com/watch?v=UXgsOhiGeag, last visited Aug. 8, 2007, one page.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Dec. 7, 2010, for U.S. Appl. No. 12/042,313, nine pages.

Non-Final Office Action dated Mar. 29, 2012, for U.S. Appl. No. 11/965,570, filed Dec. 27, 2007, 12 pages.

Non-Final Office Action dated Apr. 3, 2013, for U.S. Appl. No. 11/965,570, filed Dec. 27, 2007, 16 pages.

Notice of Allowance dated Aug. 27, 2013, for U.S. Appl. No. 11/965,570, filed Dec. 27, 2007, eight pages.

Notice of Allowance dated Jan. 16, 2014, for U.S. Appl. No. 14/075,319, filed Nov. 8, 2013, eight pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed Feb. 27, 2009, for PCT Application No. PCT/US08/087045, filed Dec. 16, 2008, four pages.

Non-Final Office Action mailed Dec. 7, 2010, for U.S. Appl. No. 12/042,313, nine pages.

* cited by examiner

INSERTION MARKER PLACEMENT ON TOUCH SENSITIVE DISPLAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The disclosed embodiments relate generally to portable electronic devices, and more particularly, to placing and adjusting an insertion marker on a portable electronic device.

BACKGROUND OF THE INVENTION

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it can prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Most portable electronic devices include applications that use text entry. Such applications can include instant messaging applications, email applications, and word processing applications, as well as other applications with text input. Because the screens on portable electronic devices are relatively small, the text and corresponding text entry tools are relatively small as well. Typically, a small cursor is displayed to indicate where text will be inserted. To date, portable electronic devices have not provided an easy, efficient way to position a cursor or other insertion marker when a user is entering text.

Accordingly, there is a need for portable multifunction devices with more intuitive user interfaces for positioning an insertion marker (e.g., a cursor) that are easy to use, configure, and/or adapt. Such interfaces increase the effectiveness, efficiency and user satisfaction with portable multifunction devices.

SUMMARY OF THE INVENTION

The above deficiencies and other problems associated with user interfaces for portable devices can be reduced or eliminated by the disclosed portable multifunction device. In some embodiments, the device can have a touch-sensitive display (also known as a "touch screen") with a graphical user interface (GUI), one or more processors, memory and one or more modules, programs or sets of instructions stored in the memory for performing multiple functions. In some embodiments, the user can interact with the GUI primarily through finger contacts and gestures on the touch-sensitive display. In some embodiments, the functions can include telephoning, video conferencing, e-mailing, instant messaging, blogging, digital photographing, digital videoing, web browsing, digital music playing, and/or digital video playing. Instructions for performing these functions can be included in a computer program product configured for execution by one or more processors.

In accordance with some embodiments, a computer-implemented method can be performed at a portable electronic device with a touch screen display. The method can include: displaying graphics on the touch screen display, detecting a finger contact on the touch screen display, and, in response to the detected finger contact, inserting an insertion marker in the graphics at a first location. The method can further include detecting a finger movement on the touch screen display and moving the insertion marker in accordance with the detected finger movement from the first location to a second location in the graphics.

In accordance with some embodiments, a portable electronic device can include a touch screen display; one or more processors; memory; and one or more programs. The one or more programs can be stored in the memory and can be configured to be executed by the one or more processors. The programs can include: instructions for displaying graphics on the touch screen display, instructions for detecting a finger contact with the touch screen display, and instructions for displaying an insertion marker at a first location in the graphics on the touch screen display in response to the detected finger contact. The programs can further include instructions for detecting movement of the finger contact on the touch screen display, and instructions for moving the insertion marker in accordance with the detected movement of the finger contact from the first location to a second location in the graphics.

In accordance with some embodiments, a computer readable storage medium can store one or more programs. The one or more programs can include instructions, which when executed by a portable electronic device with a touch screen display, can cause the device to: display graphics on the touch screen display; detect a finger contact with the touch screen display; display an insertion marker at a first location in the graphics on the touch screen display in response to the finger contact; detect movement of the finger contact on the touch screen display; and move the insertion marker in accordance with the detected movement of the finger contact from the first location to a second location in the graphics.

In accordance with some embodiments, a portable electronic device with a touch screen display can include: means for displaying graphics on the touch screen display; means for detecting a finger contact with the touch screen display; means for displaying an insertion marker at a first location in the graphics on the touch screen display in response the finger contact; means for detecting movement of the finger contact on the touch screen display; and means for moving the insertion marker in accordance with the detected movement of the finger contact from the first location to a second location in the graphics.

BRIEF DESCRIPTION OF THE DRAWINGS

For a better understanding of the aforementioned embodiments of the invention as well as additional embodiments thereof, reference should be made to the Detailed Description of the Embodiments below, in conjunction with the following drawings in which like reference numerals refer to corresponding parts throughout the figures.

DETAILED DESCRIPTION OF THE PREFERRED EMBODIMENTS

Figure 1:
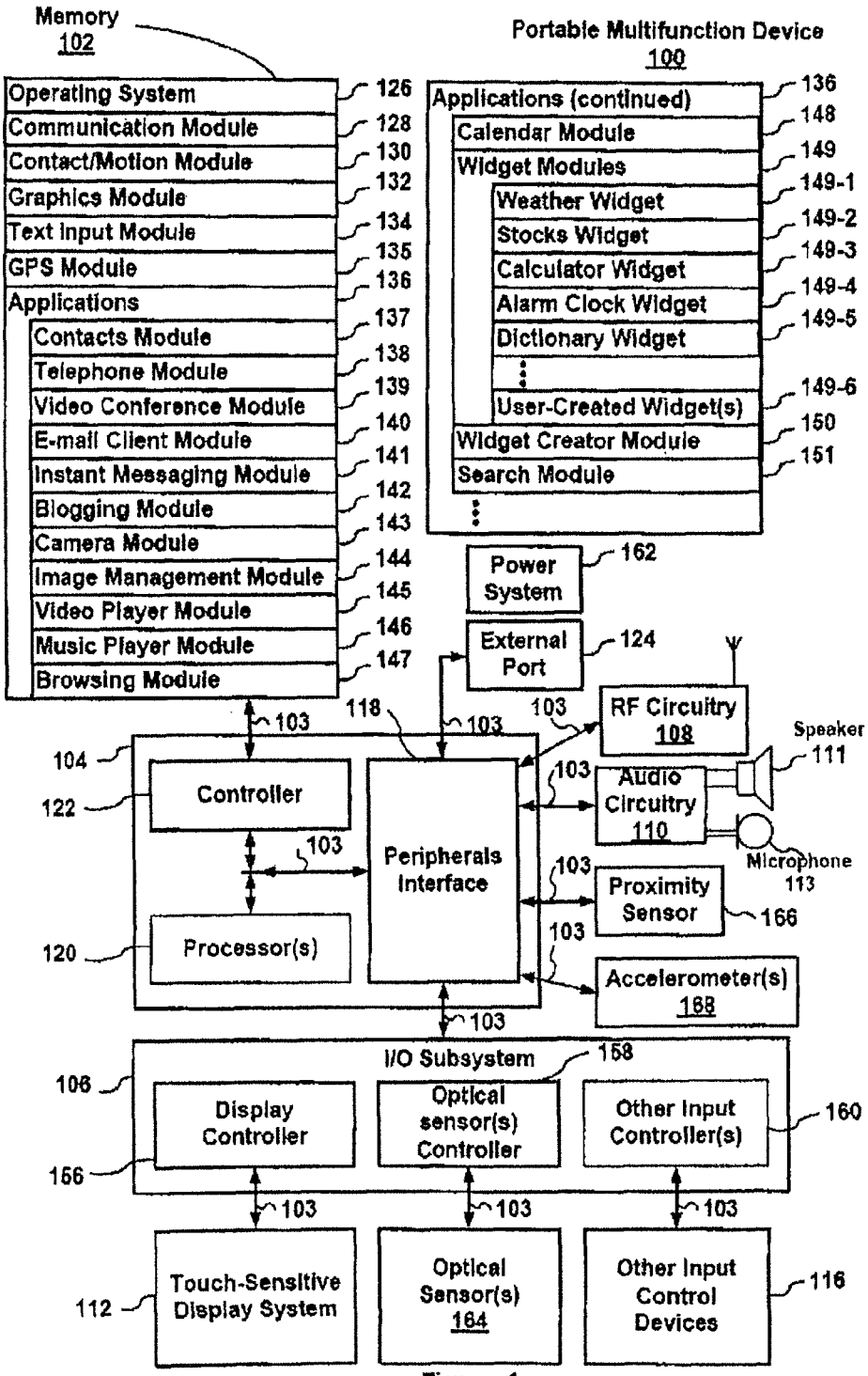
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention can be practiced without these specific details. In other instances, well-known methods, procedures, components, circuits, and networks have not been described in detail so as not to unnecessarily obscure aspects of the embodiments.

It will also be understood that, although the terms first, second, etc. can be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

For simplicity, in the discussion that follows, a portable multifunction device that includes a touch screen is used as an exemplary embodiment. It should be understood, however, that some of the user interfaces and associated processes can be applied to other devices, such as personal computers and laptop computers, which can include one or more other physical user-interface devices, such as a physical click wheel, a physical keyboard, a mouse and/or a joystick.

The device can support a variety of applications, such as a telephone application, a video conferencing application, an e-mail application, an instant messaging application, a blogging application, a digital camera application, a digital video camera application, a web browsing application, a digital music player application, and/or a digital video player application.

The various applications that can be executed on the device can use at least one common physical user-interface device, such as a touch screen. One or more functions of the touch screen, as well as corresponding information displayed on the device, can be adjusted and/or varied from one application to the next and/or within a respective application. In this way, a common physical architecture (such as the touch screen) of the device can support a variety of applications with user interfaces that can be intuitive and transparent.

The user interfaces can include one or more soft keyboard embodiments. The soft keyboard embodiments can include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and No. 11/459,615, "Touch Screen Keyboards For Portable Electronic Devices," filed Jul. 24, 2006, the contents of which are hereby incorporated by reference. The keyboard embodiments can include a reduced number of icons (or soft keys) relative to the number of keys in existing physical keyboards, such as that for a typewriter. This can make it easier for users to select one or more icons in the keyboard, and thus, one or more corresponding symbols. The keyboard embodiments can be adaptive. For example, displayed icons can be modified in accordance with user actions, such as selecting one or more icons and/or one or more corresponding symbols. One or more applications on the portable device can utilize common and/or different keyboard embodiments. Thus, the keyboard embodiment used can be tailored to at least some of the applications. In some embodiments, one or more keyboard embodiments can be tailored to a respective user. For example, one or more keyboard embodiments can be tailored to a respective user based on a word usage history (lexicography, slang, individual usage) of the respective user. Some of the keyboard embodiments can be adjusted to reduce a probability of a user error when selecting one or more icons, and thus one or more symbols, when using the soft keyboard embodiments.

Attention is now directed towards embodiments of the device. FIG. 1 is a block diagram illustrating portable multifunction device 100 with touch-sensitive display 112 in accordance with some embodiments. Touch-sensitive display 112 is sometimes referred to as a "touch screen" for convenience, and can also be known or referred to as a touch-sensitive display system. Device 100 can include memory 102 (which can include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 can include one or more optical sensors 164. These components can communicate over one or more communication buses or signal lines 103.

It should be appreciated that device 100 is only one example of a portable multifunction device 100, and that device 100 can have more or fewer components than shown, can combine two or more components, or a can have a different configuration or arrangement of the components. The various components shown in FIG. 1 can be implemented in hardware, software or a combination of both hardware and software, including one or more signal processing and/or application specific integrated circuits.

Memory 102 can include high-speed random access memory and can also include non-volatile memory, such as one or more magnetic disk storage devices, flash memory devices, or other non-volatile solid-state memory devices. Access to memory 102 by other components of device 100, such as CPU 120 and the peripherals interface 118, can be controlled by memory controller 122.

Peripherals interface 118 can couple input and output peripherals of device 100 to CPU 120 and memory 102. One or more processors 120 can run or execute various software programs and/or sets of instructions stored in memory 102 to perform various functions for device 100 and to process data.

In some embodiments, peripherals interface 118, the CPU 120, and the memory controller 122 can be implemented on a single chip, such as a chip 104. In some other embodiments, they can be implemented on separate chips.

RF (radio frequency) circuitry 108 can receive and send RE signals, also called electromagnetic signals. RF circuitry 108 can convert electrical signals to/from electromagnetic signals and communicates with communications networks and other communications devices via the electromagnetic signals. RF circuitry 108 can include well-known circuitry for performing these functions, including but not limited to an antenna system, a RF transceiver, one or more amplifiers, a tuner, one or more oscillators, a digital signal processor, a CODEC chipset, a subscriber identity module (SIM) card, memory, and so forth. RF circuitry 108 can communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication can use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), WiMAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 110, speaker 111, the microphone 113 can provide an audio interface between a user and device 100. Audio circuitry 110 can receive audio data from peripherals interface 118, convert the audio data to an electrical signal, and transmit the electrical signal to speaker 111. Speaker 111 can convert the electrical signal to human-audible sound waves. Audio circuitry 110 can also receive electrical signals converted by microphone 113 from sound waves. Audio circuitry 110 can convert the electrical signal to audio data and transmit the audio data to the peripherals interface 118 for processing. Audio data can be retrieved from and/or transmitted to memory 102 and/or RF circuitry 108 by peripherals interface 118. In some embodiments, audio circuitry 110 can also include a headset jack (e.g. 212, FIG. 2). The headset jack can provide an interface between audio circuitry 110 and removable audio input/output peripherals, such as output-only headphones or a headset with both output (e.g., a headphone for one or both ears) and input (e.g., a microphone).

I/O subsystem 106 can couple input/output peripherals on device 100, such as touch screen 112 and other input/control devices 116, to the peripherals interface 118. The I/O subsystem 106 can include a display controller 156 and one or more input controllers 160 for other input or control devices. One or more input controllers 160 can receive/send electrical signals from/to other input or control devices 116. Other input/control devices 116 can include physical buttons (e.g., push buttons, rocker buttons, etc.), dials, slider switches, joysticks, click wheels, and so forth. In some alternate embodiments, input controller(s) 160 can be coupled to any (or none) of the following: a keyboard, infrared port, USB port, and a pointer device such as a mouse. One or more buttons (e.g., 208, FIG. 2) can include an up/down button for volume control of speaker 111 and/or microphone 113. One or more buttons can include push button (e.g., 206, FIG. 2). A quick press of the push button can disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) can turn power to the device 100 on or off. The user can be able to customize a functionality of one or more of the buttons. The touch screen 112 is used to implement virtual or soft buttons and one or more soft keyboards.

Touch-sensitive touch screen 112 can provide an input interface and an output interface between the device and a user. Display controller 156 can receive and/or send electrical signals from/to touch screen 112. Touch screen 112 can display visual output to the user. The visual output can include graphics, text, icons, video, and any combination thereof (collectively termed "graphics"). In some embodiments, some or all of the visual output can correspond to user-interface objects, further details of which are described below.

Touch screen 112 can have a touch-sensitive surface, sensor or set of sensors that accepts input from the user based on haptic and/or tactile contact. Touch screen 112 and display controller 156 (along with any associated modules and/or sets of instructions in memory 102) can detect contact (and any movement or breaking of the contact) on touch screen 112 and can convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 can use LCD (liquid crystal display) technology, or LPD (light emitting polymer display) technology, although other display technologies can be used in other embodiments. Touch screen 112 and display controller 156 can detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112.

A touch-sensitive display in some embodiments of touch screen 112 can be analogous to the multi-touch sensitive tablets described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, touch screen 112 can display visual output from the portable device 100, whereas touch sensitive tablets do not provide visual output.

A touch-sensitive display in some embodiments of touch screen 112 can be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein.

Touch screen 112 can have a resolution in excess of 100 dpi. In an exemplary embodiment, touch screen 112 can have a resolution of approximately 160 dpi. The user can make contact with touch screen 112 using any suitable object or appendage, such as a stylus, a finger, and so forth. In some embodiments, the user interface is designed to work primarily with finger-based contacts and gestures, which can be much less precise than stylus-based input due to, typically, the larger area of contact of a finger on touch screen 112. In some embodiments, device 100 can translate the rough finger-based input into a precise pointer/cursor position or command for performing the actions desired by the user.

In some embodiments, in addition to the touch screen 112, device 100 can include a touchpad (not shown) for activating or deactivating particular functions. In some embodiments, the touchpad can be a touch-sensitive area of the device that, unlike the touch screen, does not display visual output. The touchpad can be a touch-sensitive surface that is separate from touch screen 112 or an extension of the touch-sensitive surface formed by touch screen 112.

In some embodiments, device 100 can include a physical or virtual click wheel as an input control device 116. A user can navigate among and interact with one or more graphical objects (henceforth referred to as icons) displayed in touch screen 112 by rotating the click wheel or by moving a point of contact with the click wheel (e.g., where the amount of movement of the point of contact is measured by its angular displacement with respect to a center point of the click wheel). The click wheel can also be used to select one or more of the displayed icons. For example, the user can press down on at least a portion of the click wheel or an associated button. User commands and navigation commands provided by the user via the click wheel can be processed by input controller 160 as well as one or more of the modules and/or sets of instructions in memory 102. For a virtual click wheel, the click wheel and click wheel controller can be part of touch screen 112 and display controller 156, respectively. For a virtual click wheel, the click wheel can be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 can also include power system 162 for powering the various components. Power system 162 can include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 can also include one or more optical sensors 164. FIG. 1 shows optical sensor(s) 164 coupled to optical sensor controller 158 in I/O subsystem 106. Optical sensor (s) 164 can include charge-coupled device (CCD) or complementary metal-oxide semiconductor (CMOS) phototransistors. Optical sensor(s) 164 can receive light from the environment, projected through one or more lens, and convert the light to data representing an image. In conjunction with imaging module 143 (also called a camera module), optical sensor 164 can capture still images or video. In some embodiments, optical sensor can be located on the back of device 100, opposite touch screen display 112 on the front of the device, so that touch screen display 112 can be used as a viewfinder for either still and/or video image acquisition. In some embodiments, an optical sensor 164 can be located on the front of the device so that the user's image can be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 can be used along with touch screen display 112 for both video conferencing and still and/or video image acquisition.

Device 100 can also include one or more proximity sensors 166. FIG. 1 shows proximity sensor 166 coupled to peripherals interface 118. Alternately, proximity sensor 166 can be coupled to input controller 160 in I/O subsystem 106. In some embodiments, proximity sensor 166 turns off and disables touch screen 112 when the multifunction device is placed near the user's ear (e.g., when the user is making a phone call). In some embodiments, proximity sensor 166 keeps touch screen 112 off when device 100 is in the user's pocket, purse, or other dark area to prevent unnecessary battery drainage when device 100 is a locked state.

Device 100 can also include one or more accelerometers 168. FIG. 1 shows accelerometer 168 coupled to peripherals interface 118. Alternately, accelerometer 168 can be coupled to input controller 160 in I/O subsystem 106. The accelerometer 168 can perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference. In some embodiments, information can be displayed on touch screen display 112 in a portrait view or a landscape view based on an analysis of data received from the one or more accelerometers.

In some embodiments, software components stored in memory 102 can include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or set of instructions) 136.

Operating system 126 (e.g., Darwin, RTXC, LINUX, UNIX, OS X, WINDOWS, or an embedded operating system such as V x Works) can include various software components and/or drivers for controlling and managing general system tasks (e.g., memory management, storage device control, power management, etc.) and can facilitate communication between various hardware and software components.

Communication module 128 can facilitate communication with other devices over one or more external ports 124 and can also include various software components for handling data received by RF circuitry 108 and/or external port 124. External port 124 (e.g., Universal Serial Bus (USB), FIREWIRE, etc.) can be adapted for coupling directly to other devices or indirectly over a network (e.g., the Internet, wireless LAN, etc.). In some embodiments, external port can be a multi-pin (e.g., 30-pin) connector that is the same as, or similar to and/or compatible with the 30-pin connector used on iPod (trademark of Apple Computer, Inc.) devices.

Contact/motion module 130 can detect contact with touch screen 112 (in conjunction with display controller 156) and other touch sensitive devices (e.g., a touchpad or physical click wheel). Contact/motion module 130 can include various software components for performing various operations related to detection of contact, such as determining if contact has occurred, determining if there is movement of the contact and tracking the movement across touch screen 112, and determining if the contact has been broken (i.e., if the contact has ceased). Determining movement of the point of contact can include determining speed (magnitude), velocity (magnitude and direction), and/or an acceleration (a change in magnitude and/or direction) of the point of contact. These operations can be applied to single contacts (e.g., one finger contacts) or to multiple simultaneous contacts (e.g., "multitouch"/multiple finger contacts). In some embodiments, contact/motion module 130 and display controller 156 can also detect contact on a touchpad. In some embodiments, contact/motion module 130 and controller 160 can detect contact on a click wheel.

Graphics module 132 can include various known software components for rendering and displaying graphics on touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a predefined, finite amount of time, such as an amount of time between 0.2 and 1.0 seconds, or between 0.5 and 2.0 seconds, depending on the context.

Text input module 134, which can be a component of graphics module 132, can provide soft keyboards for entering text in various applications (e.g., contacts 137, e-mail 140, IM 141, blogging 142, browser 147, and any other application that needs text input).

GPS module 135 can determine the location of device 100 and can provide this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

Applications 136 can include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- blogging module 142;
- camera module 143 for still and/or video images;
- image management module 144;
- video player module 145;
- music player module 146;
- browser module 147;
- calendar module 148;
- widget modules 149, which can include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153; and/or
- a map module 154.

Examples of other applications 136 that can be stored in memory 102 include other word processing applications, JAVA-enabled applications, encryption, digital rights management, voice recognition, and voice replication.

Each of the above identified modules and applications can correspond to a set of instructions for performing one or more functions described above. These modules (i.e., sets of instructions) need not be implemented as separate software programs, procedures or modules, and thus various subsets of these modules can be combined or otherwise re-arranged in various embodiments. For example, video player module 145 can be combined with music player module 146 into a single module (e.g., video and music player module 152, FIG. 1B). In some embodiments, memory 102 can store a subset of the modules and data structures identified above. Furthermore, memory 102 can store additional modules and data structures not described above.

In some embodiments, device 100 can be a device where operation of a predefined set of functions on the device can be performed exclusively through touch screen 112 and/or touchpad. By using touch screen and/or a touchpad as the primary input/control device for operation of device 100, the number of physical input/control devices (such as push buttons, dials, and the like) on device 100 can be reduced.

The predefined set of functions that can be performed exclusively through a touch screen and/or a touchpad include navigation between user interfaces. In some embodiments, the touchpad, when touched by the user, can navigate device 100 to a main, home, or root menu from any user interface that can be displayed on device 100. In such embodiments, the touchpad can be referred to as a "menu button." In some other embodiments, the menu button can be a physical push button or other physical input/control device instead of a touchpad.

Figure 2:
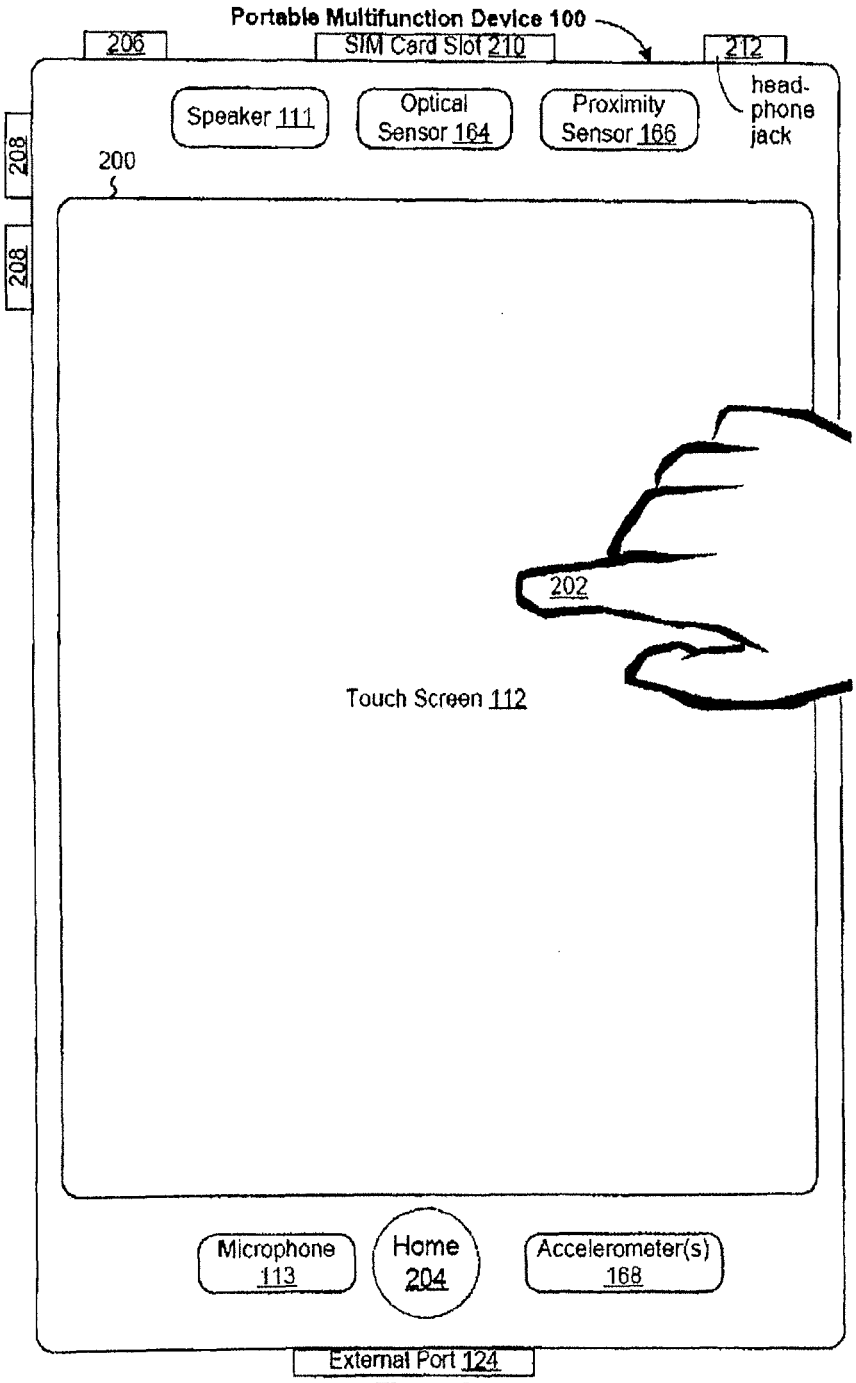
FIG. 2 illustrates a portable multifunction device having a touch screen in accordance with some embodiments.

FIG. 2 illustrates a portable multifunction device 100 having touch screen 112 in accordance with some embodiments. Touch screen 112 can display one or more graphics within user interface (UI) 200. In this embodiment, as well as others described below, a user can select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact can include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic can not select the graphic. For example, a swipe gesture that sweeps over an application icon can not select the corresponding application when the gesture corresponding to selection is a tap.

Device 100 can also include one or more physical buttons, such as "home" or menu button 204. As described previously, menu button 204 can be used to navigate to any application 136 in a set of applications that can be executed on device 100. Alternatively, in some embodiments, menu button 204 can be implemented as a soft key in a GUI in touch screen 112.

In one embodiment, device 100 can include a touch screen 112, a menu button 204, a push button 206 for powering the device on/off and locking device, volume adjustment button (s) 208, a Subscriber Identity Module (SIM) card slot 210, head set jack 212, and docking/charging external port 124. Push button 206 can be used to turn the power on/off on device 100 by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 can also accept verbal input for activation or deactivation of some functions through microphone 113.

The following disclosure relates to systems and methods for easy and quick placement and/or movement of insertion marker in text or other graphics displayed on a touch sensitive display.

According to Fitts' Law, the time for a human to point his or her finger on a target decreases logarithmically with increasing size of the target. In other words, it can take a logarithmically longer amount of time for a user to accurately place his or her finger on a small target than it would take for a slightly larger target. As an example, a user could be required to touch and hold his or her finger directly over an insertion marker before the user is permitted to drag the marker to a different location. As can be appreciated, the act of touching and holding a finger on an insertion marker can be particularly difficult if the insertion marker is small, as may be the case with many touch sensitive displays used with portable electronic devices, for example. Accordingly, accurately targeting a small target can be frustrating for a user and take away many of the benefits of having smaller electronic devices using touch sensitive displays.

As way to "get around" or reduce the disadvantages of Fitts' Law, some embodiments can use a large initial "target" area for a user to touch to begin placement of an insertion marker, thereby not requiring a precise initial touch. In addition, some embodiments can permit quick and easy positioning of an insertion marker from an initial location to a second location. For example, in some embodiments, users can initiate an insertion marker drag much faster and easier than with other methods that require a user to touch and hold his or her finger directly on the insertion marker before it can be moved.

Another way to describe this is that some embodiments of the present invention may only incur significant Fitts' Law targeting cost (i.e. time required to precisely position finger) for the final placement of an insertion marker at its desired destination; whereas, other methods may incur a first Fitts' Law targeting cost for the initial finger placement on top of the cursor and a second targeting cost for moving the insertion marker to its new destination.

Attention is now directed towards an embodiment of a user interface ("UI") and exemplary insertion marker placement processes that can be used to implement embodiments of the present invention.

Figure 3:
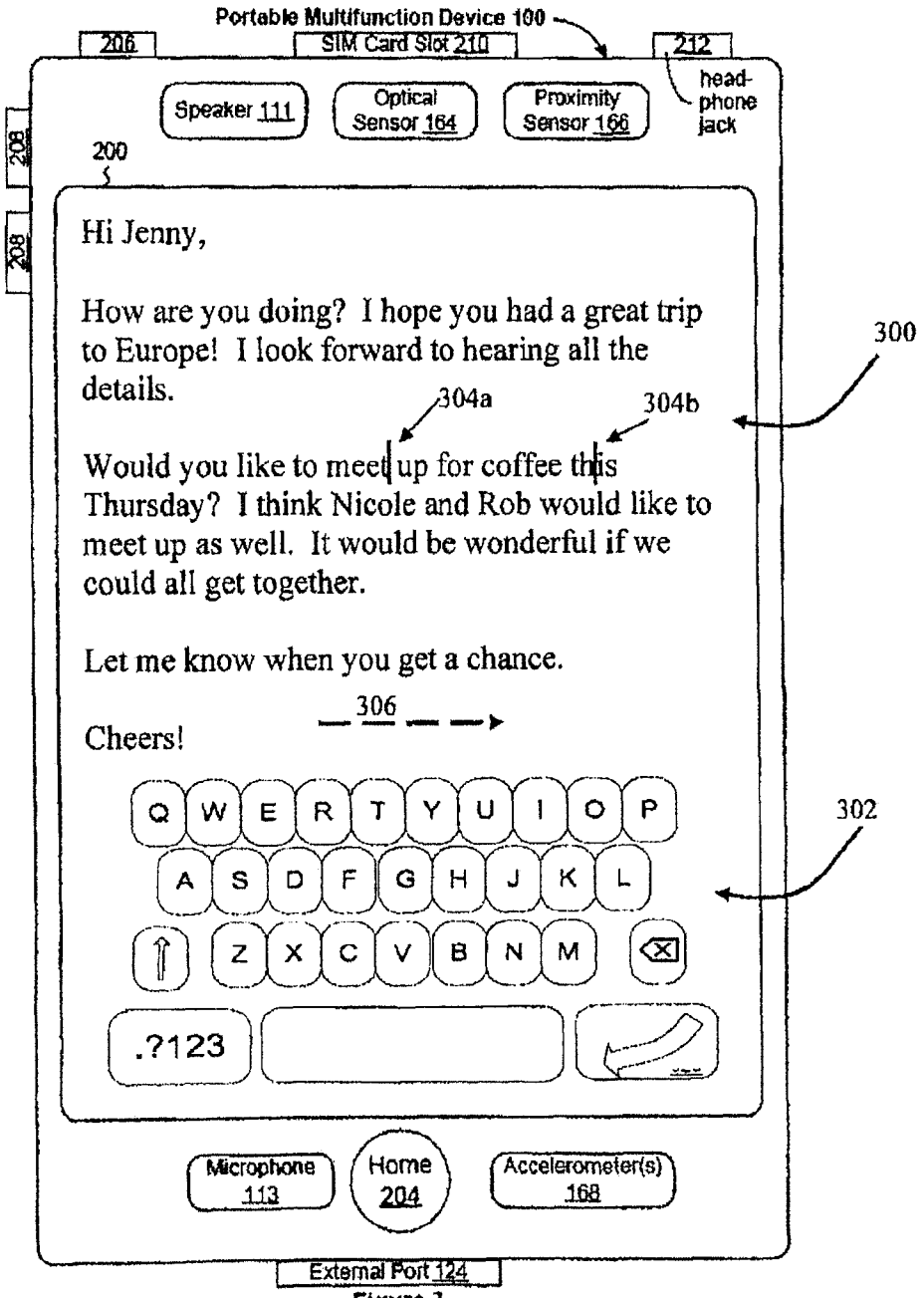
FIG. 3 illustrates an exemplary user interface for placing an insertion marker in text in accordance with some embodiments.

With reference to FIG. 3, device 100 is shown with UI in a text editing environment or mode. In such a mode, display screen 200 can display graphics 300 in the form of lines of text and soft keyboard 302 for entering text. Soft keyboard embodiments can include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and No. 11/459,615, "Touch Screen Keyboards For Portable Electronic Devices," filed Jul. 24, 2006, the contents of which are hereby incorporated by reference.

A general description of placement of insertion marker 304 (e.g., cursor, point marker, insertion bar, insertion point, or pointer) in accordance with some embodiments is described with reference to FIG. 3. To illustrate, a user can insert insertion marker 304 in graphics 300 at first location 304a. It is understood that insertion marker 304 can be inserted at various location in graphics 300, and location 304a illustrated in FIG. 3 is merely one example of such a location.

In some embodiments, insertion marker 304 can be inserted in first location 304a by a user performing a gesture on device 100, such as a single finger tap on screen 200 in proximity to location 304a. Of course, other gestures can be used as well to perform this function.

In some cases, insertion marker 304 can already be present in the displayed graphics. For example, if the UI is in a text editing mode. In such cases, a single finger tap on touch sensitive screen 200 can move insertion marker 304 from its initial location to a second location at or near where the finger tap occurred. However, in other cases, insertion marker 304 may not already be present in the graphics. For example, if the user is in a web browser mode. In such cases, a single finger tap on touch screen 200 can position insertion marker 304 in graphics displayed in the web browser environment.

In addition, in some embodiments, the user can move insertion marker 304 to a second location by performing a further gesture, such as by sliding (e.g., swiping) a finger across all or a portion of display screen 200. For example, sliding a finger across display screen 200 to the right, as indicated by arrow 306, can move (e.g., "drag") insertion marker 304 in accordance with the movement of the user's finger to second location 304b in graphics 300. Accordingly, a user can move insertion marker 304 in graphics 300 by performing one or more predefined gestures, such as a slide of the user's finger across display screen 200.

As used in this disclosure, the phrase moving "in accordance with" can include moving an object relative to another object or moving an object in proportion with another object, for example.

Figure 4:
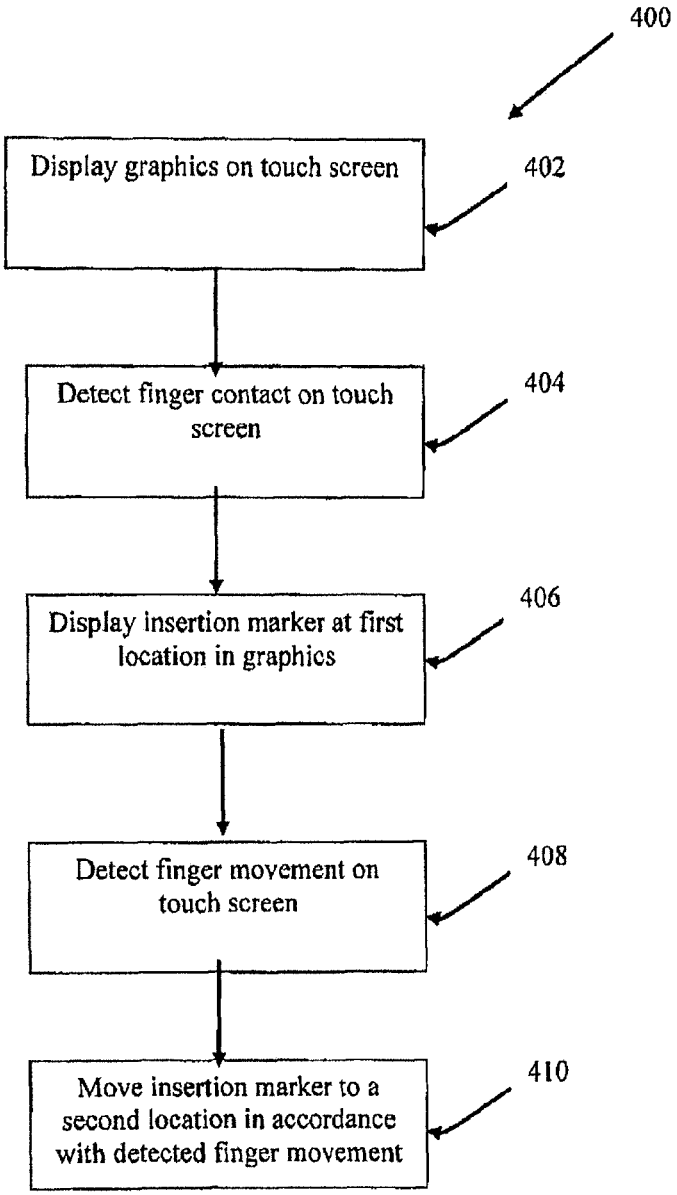
FIG. 4 is a flow diagram illustrating a process for displaying and using an insertion marker in accordance with some embodiments.

FIG. 4 is a flow diagram illustrating process 400 for placement and movement of an insertion marker in accordance with some embodiments. From time-to-time process 400 is described in terms of being used in a text editing environment, such as when a device implementing the process 400 is running a word processing, email, note pad, instant message, or blogging application, for example. Furthermore, process 400 is described in the context of using device 100 illustrated in FIG. 3. Description in terms of this environment and device is provided to allow the various features and embodiments to be portrayed in the context of an exemplary application. However, this disclosure should not be limited to this specific application or device, but can also be applied in other ways.

As discussed above, process 400 can be used while device 100 is in a text editing mode, but need not be. In addition, in accordance with some embodiments, if not already in a text editing mode, device 100 can be placed in a text editing mode through use of a particular gesture, for example by a user tapping touch screen 200 on a particular icon displayed on touch screen 200.

In step 402, graphics 300 can be displayed on touch screen 200. As discussed above, graphics 300 can include text, icons, video, and any combination thereof.

Next, in step 404, a finger contact associated with inserting insertion marker 304 can be detected on the touch screen 200. In some embodiments, the finger contact can be a finger tap in a text entry portion of the touch screen 200. However, the finger contact can also be some other predefined gesture or gestures, such as one or more finger taps, on touch screen 200.

In response to the detected finger contact in step 404, insertion marker 304 can be inserted into graphics 300 at a first location in step 406, for example first location 304a illustrated in FIG. 3. In some embodiments, insertion marker 304 can be placed at a front end or a back end of a word located proximate to the detected finger contact. In some embodiments, insertion marker 304 can always be placed at the end of the proximate word. In other embodiments, insertion marker 304 can always be placed at the beginning of the proximate word. Of course, insertion marker 304 need not be placed at the beginning or the end of a word, but can instead be placed within a word as well. In addition, in some embodiments, the word located proximate the finger contact can be the word located closest to the finger contact and, in the event the detected finger contact is a sliding gesture, the proximate word can be the word located closest to either where the sliding gesture started or ended on display screen 200. As one example, insertion marker 304 can be placed at an end of a word on which the user tapps.

Furthermore, insertion marker 304 need not be placed within or next to a word. Instead, the insertion marker can also be placed within or next to some other type of graphic, such as a picture, symbol or icon.

With further reference to FIG. 4, finger movement can be detected in step 408. In some embodiments, finger movement can be anywhere on touch screen 200. In other embodiments, finger movement must be in a predefined area, such as a text entry area on touch screen 200.

Furthermore, various types of finger movements can be detected in step 408. In some embodiments, the finger movement can be a user sliding a finger across all or a portion of touch screen 200. In addition, the finger contact (detected in step 404) and the finger movement (detected in step 408) can be a continuous contact on the touch screen 200 (e.g., the user maintains the finger on the display during both steps 404 and 408), or can be separate contacts (e.g., the user taps a finger on display 200, lifts the finger up and then swipes the finger across display 200).

The finger movement detected in step 408 can also be performed on a portion of touch screen 200 that is located remotely from the area of touch screen 200 where the finger contact was detected in step 404. For example, a user can contact touch screen 200 on top of a desired insertion point, such as at location 304a, to insert insertion marker 304 proximate the word "meet" in FIG. 3. The user can then swipe touch screen 200 sideways (e.g., horizontally), at a different location on the touch screen 200, such as at the location of the dotted arrow 306 illustrated in FIG. 3, to cause insertion marker 304 to move in accordance with the direction of the swipe (e.g., right hand direction, as shown in FIG. 3). Thus, finger movement used to move insertion marker 304 can be performed irrespective of the initial distance of the finger contact on the touch screen display from the location of the insertion marker. Permitting finger movement in step 408 remote from the finger contact detected in step 404 can allow a user to move insertion marker 304 without obstructing the view of the insertion marker 304; as opposed to requiring the user to move his or her finger on top of or very close to insertion marker 304, which can require precise finger targeting and can also obstruct the user's view of the insertion marker 304 and adjacent graphics.

In step 410, insertion marker 304 can be moved in accordance with the detected movement of the finger contact from a first location to a second location in the graphics. For example, as shown in FIG. 3, insertion marker 304 can be moved from location 304a to location 304b. In some embodiments, insertion marker 304 can move horizontally within the graphics in response to a horizontal finger movement and the insertion marker can move vertically in response to a vertical finger movement. In addition, in some embodiments, movement of insertion marker 304 from a first location to a second location can be animated on touch screen 200. As discussed above, the phrase moving "in accordance with" can include moving an object relative to another object or moving an object in proportion to another object, for example.

Also, in some embodiments, insertion marker 304 can be moved within words in step 410. Accordingly, a user need not be precise with the original placement of insertion marker 304, as the user can initially place insertion marker 304 near a desired location in the graphics and then move insertion marker 304 to the desired location in a word, as location 304b shown in FIG. 3, for example. Doing so can reduce the disadvantages of Fitts' law, as discussed above, because initial precise targeting may not be needed. Instead, the user can move insertion marker 304 to the desired location.

Insertion marker 304 can also be scrolled from a one line of text to another line of text. In some embodiments, sliding a finger sideways (horizontally) can move insertion marker 304 from one line of text to another. For example, if insertion marker moves to, or is located at, an end of a line of text, then sliding a finger in a right-hand, sideways direction on the display screen can cause insertion maker 304 to move to the beginning of the following line of text. If further movement in the right-hand direction is detected, then insertion marker 304 can continue moving through the following line of text in accordance with that direction. Similarly, moving insertion marker 304 in a left-hand direction can cause insertion marker 304 to move to the end of a preceding line of text and further movement of the finger in the left-hand direction can continue the movement of insertion marker 304 to the preceding line of text. In addition, in some embodiments, sliding a finger across touch screen 200 in a vertical direction can cause insertion marker 304 to move from one line of text to another line of text in accordance with the direction of the detected finger movement.

In some embodiments, the finger contact detected in step 404 need not be the same finger as the finger detected in step 408. For example, in some embodiments, a user can place a first finger on touch screen 200 (step 404), which places insertion marker 304 at first location, such as location 304a, in step 406. Without lifting the first finger, the user can then move a second finger across touch screen 200 (step 408), which can move insertion marker 304 to second location, such as location 304b, in accordance with the movement the second finger (step 410).

In some embodiments, a detected finger movement (step 408) can have a horizontal component on the touch screen display and a vertical component on the touch screen display. In some embodiments, moving insertion marker 304 in accordance with the detected finger movement can include moving insertion marker 304 in accordance with only the horizontal component of motion of the finger movement (i.e., using the horizontal component but not the vertical component).

Once insertion marker 304 is in a desired location, the user can then perform various functions, such as editing the text adjacent to the location of insertion marker 304, such as by adding or deleting text at the insertion marker location using keypad 302.

Advantageously, insertion marker placement process 400 can co-exist with other gestures that can trigger other types of actions. For example, in some embodiments scrolling editable text can be done by starting with a vertical slide and insertion marker placement can be performed using a sideways finger slide.

An exemplary process 500 illustrating co-existing scroll mode and insertion marker placement mode is described with reference to FIG. 5. In general, process 500 can permit a user to initiate either a scroll mode or a text insertion mode depending upon the gesture used by the user.

Process 500 is described from time-to-time in terms of being used in a text editing environment. Description in terms of this environment is provided to allow the various features and embodiments to be portrayed in the context of an exemplary application. However, this disclosure should not be limited to this specific application, but can also be applied in other ways.

Figure 5:
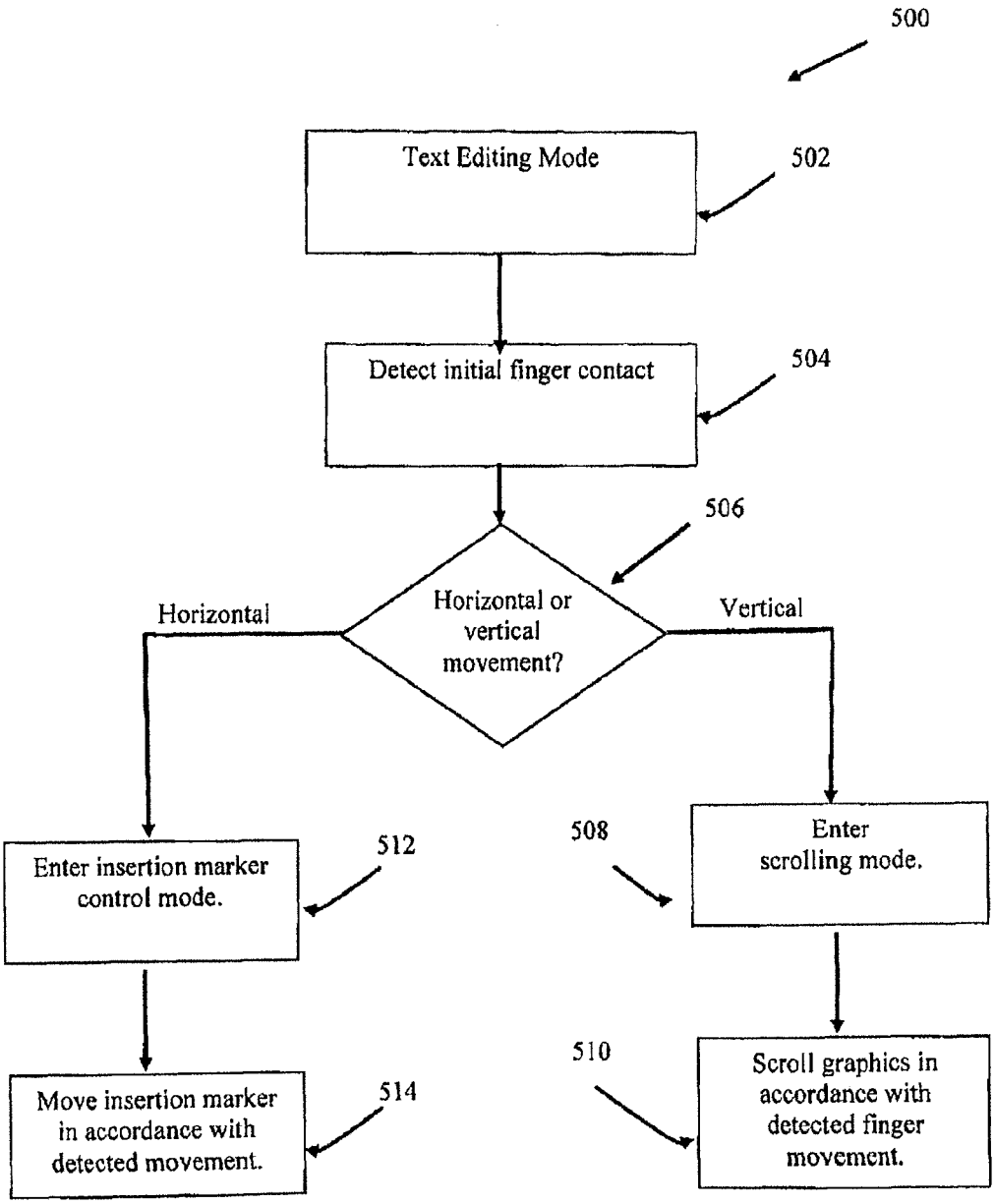
FIG. 5 is a flow diagram illustrating co-existing scroll mode and insertion marker placement mode processes for displaying and using an insertion marker in accordance with some embodiments.

With further reference to FIG. 5, a device, such as device 100, implementing process 500 can be in a text editing mode in block 502. This can mean that device 100 is displaying graphics in the form of text. Also, while in a text editing mode, an insertion marker can already be displayed at a first location in the graphics. If not, a user can insert an insertion marker as described above with reference to FIG. 4.

Next, device 100 can detect an initial contact on touch screen 200 in step 504. In step 506, device can determine if the initial contact was a horizontal (i.e. sideways) or a vertical movement. The movement can be in the form of a finger slide or a finger swipe. In some cases, the movement can have both a horizontal component and a vertical component on the touch screen display. In such a case, process 500 can decide that the movement was either horizontal or vertical in step 506 by determining the larger of the horizontal component and the vertical component.

If the detected movement in step 506 is determined to be a vertical finger movement, then a scrolling mode can be activated or initiated in step 510. In addition, graphics can be scrolled in accordance with the detected finger movement in step 510. Further scrolling can be performed by additional finger movement on touch screen 200.

On the other hand, if the detected movement in step 506 is determined to be horizontal finger movement, an insertion marker control mode can be activated or initiated in step 512. The insertion marker can then be moved from its initial, first location to a second location in accordance with the detected horizontal finger movement. Further movement of the insertion marker can be performed by additional finger movements on touch screen 200.

Thus, process 500 can have many benefits. For example, a user can move an insertion marker to a desired location by simply sliding his or her finger across display screen 200. In addition, process 500 need not require precise placement of the user's finger over a small target to initiate a cursor placement mode, because, in some embodiments, cursor placement mode can be initiated by a horizontal finger movement anywhere on the touch screen 200, irrespective of initial distance from finger to insertion marker. Other embodiments can require the horizontal finger movement to be detected on particular portions of touch screen 200, such as in a text entry area. But in those embodiments, the particular portion of the touch screen can still be larger than the small target area required in other methods.

An exemplary process 600 illustrating co-existing insertion marker insertion and insertion marker placement functions are described with reference to FIG. 6. In general, process 600 can permit a user to initiate either an insertion marker insertion in graphics or an insertion marker movement in graphics depending upon a gesture used by the user. Specific gestures are described with reference to FIG. 6, but other gestures can likewise be used without deviating from the scope of the present invention.

In addition, process 600 is described from time-to-time in terms of being used in a text editing environment. Description in terms of this environment is provided to allow the various features and embodiments to be portrayed in the context of an exemplary application. However, this disclosure should not be limited to this specific application, but can also be applied in other ways.

Figure 6:
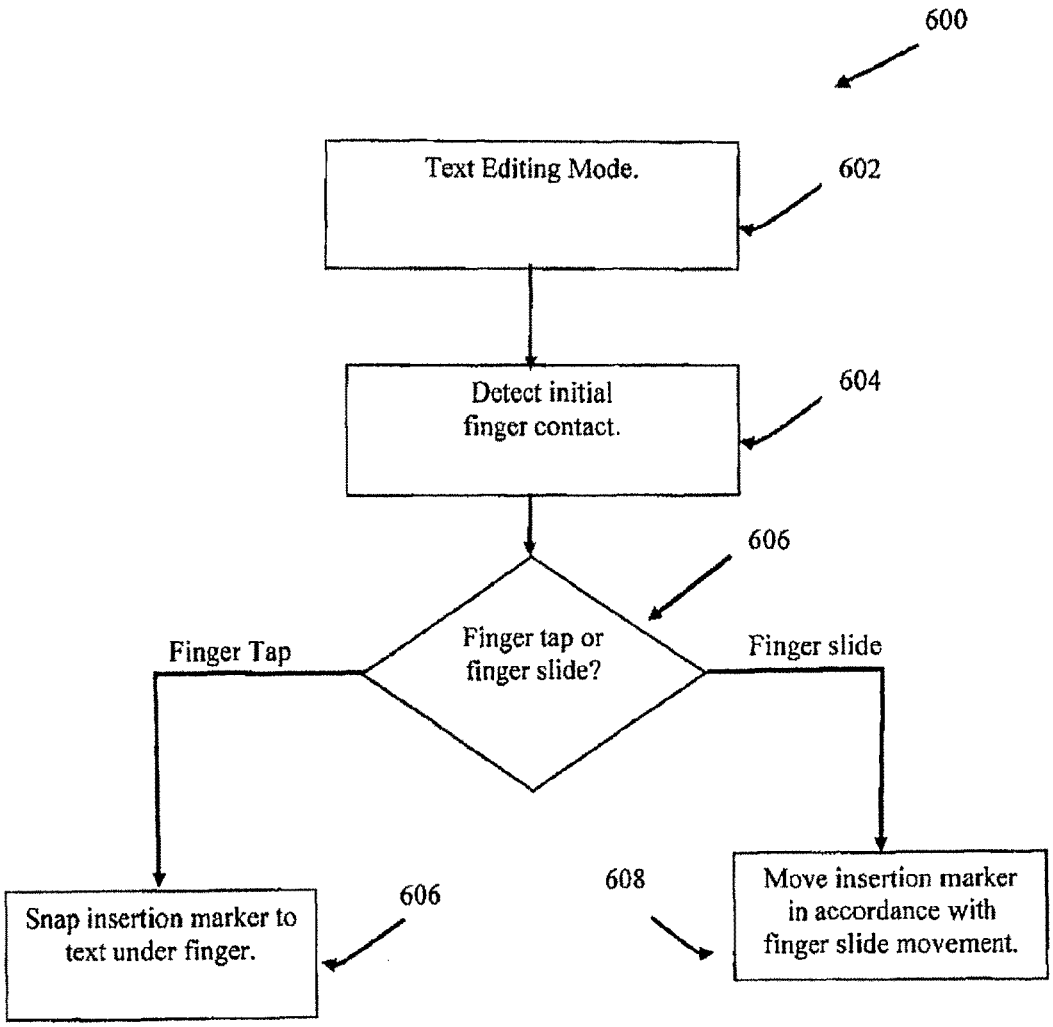
FIG. 6 is a flow diagram illustrating a process for initiating art insertion marker insertion or insertion marker movement in accordance with some embodiments.

With further reference to FIG. 6, a device, such as device 100, implementing process 600 can be in a text editing mode in block 602. This can mean that device 100 is displaying graphics in the form of text. Also, while in a text editing mode, an insertion marker can already be displayed at a first location in the graphics.

Next, device 100 can detect an initial contact on touch screen 200 in step 604. In step 606, device 100 can determine if the initial contact was a finger tap (e.g., a quick touch and lift off of a finger) or a finger slide (e.g., a horizontal movement on the touch surface).

If device 100 determines that the contact was a finger tap, then an insertion marker can be placed in or proximate to the graphics (e.g., a textual word) located beneath the finger tap in step 608. This can change the location of an insertion marker from a first location (e.g., where the insertion marker was located prior to the finger tap) to a second location in the graphics where the finger tap occurred. This can be a quick way to move the location of the insertion marker in graphics.

If the device determines that the contact was a finger slide, then the insertion marker can be moved in the graphics in accordance with the finger slide movement in step 608. For example, if the detected finger slide movement is in a right-hand direction, then the insertion marker can move proportionally in the right-hand direction in the graphics. In accordance with some embodiments, the finger slide can be performed on touch screen 200 at a location irrespective of initial distance form finger to insertion marker. Moving the insertion marker in this manner can be a quick and easy way to accurately position the location of the insertion marker in graphics.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:

displaying graphics on a touch screen display;

detecting a first contact with the touch screen display;

in response to the detected first contact, inserting an insertion marker in the graphics at a first location;

detecting a second contact with the touch screen display, the second contact detected at a location independent of the first location;

detecting movement of the second contact on the touch screen display;

determining whether the detected movement of the second contact has a larger horizontal component or a larger vertical component;

in response to a determination that the detected movement of the second contact has a larger horizontal component, initiating an insertion marker control mode for moving the insertion marker in accordance with the detected movement of the second contact from the first location to a second location in the graphics; and in response to a determination that the detected movement of the second contact has a larger vertical component, initiating a scrolling mode for scrolling the graphics in accordance with the detected moment of the second contact.

2. The method of claim 1, wherein the insertion marker is a cursor, insertion bar, insertion point, or pointer.

3. The method of claim 1, wherein the first location is located proximate to the location of the detected first contact.

4. The method of claim 1, wherein the graphics comprise text.

5. The method of claim 4, wherein the detected first contact is located on top of a word in the text and wherein the first location is located at the front or the end of the word.

6. The method of claim 4, further comprising determining a word in the text located closest to the detected first contact, wherein the first location is located at the front or the end of the word.

7. The method of claim 6, wherein the second location is within the word.

8. The method of claim 4, wherein the detected movement of the second contact comprises a finger sliding horizontally across the touch screen display relative to the text.

9. The method of claim 8, wherein, in response to the horizontal finger movement, moving the insertion marker from a first line of text to a second line of text.

10. The method of claim 4, wherein the detected movement of the second contact comprises a finger sliding vertically on the touch screen display with respect to lines of text.

11. The method of claim 10, wherein, in response to the vertical finger movement, moving the insertion marker from a first line of text to a second line of text.

12. The method of claim 1, wherein the movement is detected without breaking the detected second contact.

13. The method of claim 1, wherein the detected first contact comprises detecting one or more taps on the touch screen display and the detected movement of the second contact comprises detecting a slide across a portion of the touch screen display.

14. The method of claim 1, wherein moving the insertion marker in accordance with the detected movement of the second contact includes moving the insertion marker in a first area of the touch screen that includes characters entered using a soft keyboard, wherein the soft keyboard is located in a second area of the touch screen that is separate from the first area.

15. The method of claim 1, wherein the moving includes an animation of the insertion marker moving to the second location.

16. A computer-implemented method, comprising:

displaying graphics on a touch screen display;

displaying an insertion marker in the graphics at a first location;

detecting a contact with the touch screen display, the contact detected at a location independent of the first location;

detecting movement of the contact on the touch screen display;

determining whether the detected movement of the contact has a larger horizontal component or a larger vertical component;

in response to a determination that the detected movement of the contact has a larger horizontal component, initiating an insertion marker control mode; and in response to a determination that the detected movement of the contact has a larger vertical component, initiating a scrolling mode.

17. The method of claim 16, further comprising:

moving the insertion marker in the graphics in accordance with the detected contact movement if the insertion marker control mode is initiated; and scrolling the graphics in accordance with the detected contact movement if the scrolling mode is initiated.

18. A portable electronic device, comprising:

a touch screen display;

one or more processors;

memory; and one or more programs, wherein the one or more programs are stored in the memory and capable of being executed by the one or more processors, the one or more programs including:

instructions for displaying graphics on the touch screen display;

instructions for displaying an insertion marker in the graphics at a first location;

instructions for detecting a contact with the touch screen display, the contact detected at a location independent of the first location;

instructions for detecting movement of the contact on the touch screen display;

instructions for determining whether the detected movement of the contact has a larger horizontal component or a larger vertical component;

instructions for initiating an insertion marker control mode if the detected movement of the contact has a larger horizontal component; and instructions for initiating a scrolling mode if the detected movement of the contact has a larger vertical component.

19. The device of claim 18, wherein the detected movement of the contact comprises a finger sliding across at least a portion of the touch screen display.

20. A portable electronic device with a touch screen display, comprising:

means for displaying graphics on the touch screen display;

means for displaying an insertion marker in the graphics at a first location;

means for detecting a contact with the touch screen display, the contact detected at a location independent of the first location;

means for detecting movement of the contact on the touch screen display;

means for determining whether the detected movement of the contact has a larger horizontal component or a larger vertical component;

means for initiating an insertion marker control mode if the detected movement of the contact has a larger horizontal component; and means for initiating a scrolling mode if the detected movement of the contact has a larger vertical component.

21. The device of claim 20, wherein the movement of the contact comprises a finger sliding across at least a portion the touch screen display.

*22. A method comprising:*

*at a computing device with a touch screen:*

*displaying, on the touch screen, a user interface that includes:*

*a content display area that includes:*

*content, and*

*an insertion marker displayed at a first location in the content; and*

*a keyboard display area that includes a soft keyboard;*

*while displaying the user interface on the touch screen, detecting, independent of the first location of the insertion marker in the content, an input including touch-down of a first contact on the touch screen in the keyboard display area of the user interface, and a movement of the first contact from a first location on the touch screen to a second location on the touch screen; and*

*in response to detecting the input in the keyboard display area of the user interface:*

*in accordance with the movement of the first contact having a horizontal component that is larger than a vertical component, moving the insertion marker from the first location in the content to a second location in the content in accordance with at least the movement of the first contact detected in the keyboard display area of the user interface; and*

*in accordance with the movement of the first contact having the vertical component that is larger than the horizontal component, scrolling the content in accordance with the movement of the first contact detected in the keyboard display area of the user interface.*

*23. The method of claim 22, wherein the content comprises text, and the first location in the content and the second location in the content comprise different locations in the text.*

*24. The method of claim 22, wherein the first contact is detected on the soft keyboard in the keyboard display area of the user interface.*

*25. The method of claim 22, wherein the movement of the insertion marker from the first location in the content to the second location in the content comprises a horizontal movement of the insertion marker in the content corresponding to the horizontal component of the movement of the first contact.*

*26. The method of claim 22, wherein the movement of the insertion marker from the first location in the content to the second location in the content comprises a vertical movement of the insertion marker in the content corresponding to the vertical component of the movement of the first contact.*

*27. The method of claim 22, wherein the movement of the insertion marker from the first location in the content to the second location in the content comprises a horizontal movement of the insertion marker in the content corresponding to the horizontal component of the movement of the first contact and a vertical movement of the insertion marker in the content corresponding to the vertical component of the movement of the first contact.*

*28. The method of claim 22, wherein the movement of the insertion marker from the first location in the content to the second location in the content is further in accordance with a direction of the movement of the first contact.*

*29. The method of claim 22, further comprising:*

*prior to detecting the first contact in the keyboard display area of the user interface:*

*detecting keyboard input at the soft keyboard, the keyboard input for entering the content into the content display area of the user interface; and*

*in response to detecting the keyboard input at the soft keyboard, entering the content into the content display area of the user interface in accordance with the keyboard input detected at the soft keyboard.*

*30. The method of claim 22, wherein the insertion marker comprises a cursor, an insertion bar, an insertion point, or a pointer.*

*31. The method of claim 22, wherein the first contact and the movement of the first contact on the touch screen correspond to a finger sliding across the touch screen.*

*32. The method of claim 22, wherein:*

*detecting the first contact and the movement of the first contact on the touch screen comprises concurrently detecting:*

*the first contact and the movement of the first contact; with*

*a second contact, different from the first contact, on the touch screen, and*

*moving the insertion marker from the first location in the content to the second location in the content is in response to concurrently detecting:*

*the first contact and the movement of the first contact; with*

*the second contact on the touch screen.*

*33. The method of claim 32, wherein the second contact is stationary while the first contact is moved.*

*34. The method of claim 32, wherein the first contact corresponds to a first finger detected on the touch screen, and the second contact corresponds to a second finger, different from the first finger, detected concurrently with the first finger on the touch screen.*

*35. The method of claim 22, wherein displaying the user interface on the touch screen is during a text editing mode of the computing device, the method further comprising;*

*before moving the insertion marker from the first location in the content to the second location in the content, transitioning the computing device from the text editing mode to an insertion marker control mode, wherein moving the insertion marker from the first location in the content to the second location in the content is during the insertion marker control mode.*

*36. The method of claim 22, wherein the first location on the touch screen and the second location on the touch screen are within the keyboard display area of the user interface.*

*37. A non-transitory computer-readable medium storing instructions, which when executed by one or more processors of a computing device with a touch screen, cause the one or more processors to perform a method comprising:*

*displaying, on the touch screen, a user interface that includes:*

*a content display area that includes:*

*content, and*

*an insertion marker displayed at a first location in the content; and*

*a keyboard display area that includes a soft keyboard;*

*while displaying the user interface on the touch screen, detecting, independent of the first location of the insertion marker in the content, an input including touchdown of a first contact on the touch screen in the keyboard display area of the user interface, and a movement of the first contact from a first location on the touch screen to a second location on the touch screen; and*

*in response to detecting the input in the keyboard display area of the user interface:*

*in accordance with the movement of the first contact having a horizontal component that is larger than a vertical component, moving the insertion marker from the first location in the content to a second location in the content in accordance with at least the movement of the first contact detected in the keyboard display area of the user interface; and*

*in accordance with the movement of the first contact having the vertical component that is larger than the horizontal component, scrolling the content in accordance with the movement of the first contact detected in the keyboard display area of the user interface.*

*38. A computing device comprising:*

*one or more processors;*

*a touch screen; and*

*memory storing instructions, which when executed by the one or more processors, cause the one or more processors to perform a method comprising:*

*displaying, on the touch screen, a user interface that includes:*

*a content display area that includes:*

*content, and*

*an insertion marker displayed at a first location in the content; and*

*a keyboard display area that includes a soft keyboard;*

*while displaying the user interface on the touch screen, detecting, independent of the first location of the insertion marker in the content, an input including touchdown of a first contact on the touch screen in the keyboard display area of the user interface, and a movement of the first contact from a first location on the touch screen to a second location on the touch screen; and*

*in response to detecting the input in the keyboard display area of the user interface:*

*in accordance with the movement of the first contact having a horizontal component that is larger than a vertical component, moving the insertion marker from the first location in the content to a second location in the content in accordance with at least the movement of the first contact detected in the keyboard display area of the user interface; and*

*in accordance with the movement of the first contact having the vertical component that is larger than the horizontal component, scrolling the content in accordance with the movement of the first contact detected in the keyboard display area of the user interface.*

*39. The non-transitory computer-readable medium of claim 37, wherein the content comprises text, and the first location in the content and the second location in the content comprise different locations in the text.*

*40. The non-transitory computer-readable medium of claim 37, wherein the first contact is detected on the soft keyboard in the keyboard display area of the user interface.*

*41. The non-transitory computer-readable medium of claim 37, wherein the movement of the insertion marker from the first location in the content to the second location in the content comprises a horizontal movement of the insertion marker in the content corresponding to the horizontal component of the movement of the first contact.*

*42. The non-transitory computer-readable medium of claim 37, wherein the movement of the insertion marker from the first location in the content to the second location in the content comprises a vertical movement of the insertion marker in the content corresponding to the vertical component of the movement of the first contact.*

*43. The non-transitory computer-readable medium of claim 37, wherein the movement of the insertion marker from the first location in the content to the second location in the content comprises a horizontal movement of the insertion marker in the content corresponding to the horizontal component of the movement of the first contact and a vertical movement of the insertion marker in the content corresponding to the vertical component of the movement of the first contact.*

*44. The non-transitory computer-readable medium of claim 37, wherein the movement of the insertion marker from the first location in the content to the second location in the content is further in accordance with a direction of the movement of the first contact.*

*45. The non-transitory computer-readable medium of claim 37, wherein the method further comprises:*

*prior to detecting the first contact in the keyboard display area of the user interface:*

*detecting keyboard input at the soft keyboard, the keyboard input for entering the content into the content display area of the user interface; and*

*in response to detecting the keyboard input at the soft keyboard, entering the content into the content display area of the user interface in accordance with the keyboard input detected at the soft keyboard.*

*46. The non-transitory computer-readable medium of claim 37, wherein the insertion marker comprises a cursor, an insertion bar, an insertion point, or a pointer.*

*47. The non-transitory computer-readable medium of claim 37, wherein the first contact and the movement of the first contact on the touch screen correspond to a finger sliding across the touch screen.*

*48. The non-transitory computer-readable medium of claim 37, wherein:*

*detecting the first contact and the movement of the first contact on the touch screen comprises concurrently detecting:*

*the first contact and the movement of the first contact; with*

*a second contact, different from the first contact, on the touch screen, and*

*moving the insertion marker from the first location in the content to the second location in the content is in response to concurrently detecting:*

*the first contact and the movement of the first contact; with*

*the second contact on the touch screen.*

*49. The non-transitory computer-readable medium of claim 48, wherein the second contact is stationary while the first contact is moved.*

*50. The non-transitory computer-readable medium of claim 48, wherein the first contact corresponds to a first finger detected on the touch screen, and the second contact corresponds to a second finger, different from the first finger, detected concurrently with the first finger on the touch screen.*

*51. The non-transitory computer-readable medium of claim 37, wherein displaying the user interface on the touch screen is during a text editing mode of the computing device, the method further comprising;*

*before moving the insertion marker from the first location in the content to the second location in the content, transitioning the computing device from the text editing mode to an insertion marker control mode, wherein moving the insertion marker from the first location in the content to the second location in the content is during the insertion marker control mode.*

*52. The non-transitory computer-readable medium of claim 37, wherein the first location on the touch screen and the second location on the touch screen are within the keyboard display area of the user interface.*

*53. The computing device of claim 38, wherein the content comprises text, and the first location in the content and the second location in the content comprise different locations in the text.*

*54. The computing device of claim 38, wherein the first contact is detected on the soft keyboard in the keyboard display area of the user interface.*

*55. The computing device of claim 38, wherein the movement of the insertion marker from the first location in the content to the second location in the content comprises a horizontal movement of the insertion marker in the content corresponding to the horizontal component of the movement of the first contact.*

*56. The computing device of claim 38, wherein the movement of the insertion marker from the first location in the content to the second location in the content comprises a vertical movement of the insertion marker in the content corresponding to the vertical component of the movement of the first contact.*

*57. The computing device of claim 38, wherein the movement of the insertion marker from the first location in the content to the second location in the content comprises a horizontal movement of the insertion marker in the content corresponding to the horizontal component of the movement of the first contact and a vertical movement of the insertion marker in the content corresponding to the vertical component of the movement of the first contact.*

*58. The computing device of claim 38, wherein the movement of the insertion marker from the first location in the content to the second location in the content is further in accordance with a direction of the movement of the first contact.*

*59. The computing device of claim 38, wherein the method performed by the one or more processors further comprises:*

*prior to detecting the first contact in the keyboard display area of the user interface:*

*detecting keyboard input at the soft keyboard, the keyboard input for entering the content into the content display area of the user interface; and*

*in response to detecting the keyboard input at the soft keyboard, entering the content into the content display area of the user interface in accordance with the keyboard input detected at the soft keyboard.*

*60. The computing device of claim 38, wherein the insertion marker comprises a cursor, an insertion bar, an insertion point, or a pointer.*

*61. The computing device of claim 38, wherein the first contact and the movement of the first contact on the touch screen correspond to a finger sliding across the touch screen.*

*62. The computing device of claim 38, wherein:*

*detecting the first contact and the movement of the first contact on the touch screen comprises concurrently detecting:*

*the first contact and the movement of the first contact; with*

*a second contact, different from the first contact, on the touch screen, and*

*moving the insertion marker from the first location in the content to the second location in the content is in response to concurrently detecting:*

*the first contact and the movement of the first contact; with*

*the second contact on the touch screen.*

*63. The computing device of claim 62, wherein the second contact is stationary while the first contact is moved.*

*64. The computing device of claim 62, wherein the first contact corresponds to a first finger detected on the touch screen, and the second contact corresponds to a second finger, different from the first finger, detected concurrently with the first finger on the touch screen.*

*65. The computing device of claim 38, wherein displaying the user interface on the touch screen is during a text editing mode of the computing device, the method further comprising;*

*before moving the insertion marker from the first location in the content to the second location in the content, transitioning the computing device from the text editing mode to an insertion marker control mode, wherein moving the insertion marker from the first location in the content to the second location in the content is during the insertion marker control mode.*

*66. The computing device of claim 38, wherein the first location on the touch screen and the second location on the touch screen are within the keyboard display area of the user interface.*

* * * * *